United States Patent [19]
Lyon-Caen et al.

[11] 4,055,728
[45] Oct. 25, 1977

[54] FINE DIVISION TELEPHONE MULTIPLEXED SWITCHING NETWORK

[75] Inventors: Robert Lyon-Caen; Pham Ngu Tung, both of Paris, France

[73] Assignee: Thomson-CSF, Paris, France

[21] Appl. No.: 668,687

[22] Filed: Mar. 19, 1976

[30] Foreign Application Priority Data

Mar. 21, 1975 France ................... 75.08944

[51] Int. Cl.$^2$ ............................................. H04Q 11/04
[52] U.S. Cl. ............................ 179/15 AT; 179/18 GF
[58] Field of Search ........ 179/15 AT, 18 GF, 15 AQ

[56] References Cited

U.S. PATENT DOCUMENTS

| | | | |
|---|---|---|---|
| 3,740,483 | 6/1973 | Pederson | 179/15 AT |
| 3,912,871 | 10/1975 | Battocletti | 179/15 AQ |

Primary Examiner—Thomas W. Brown
Attorney, Agent, or Firm—Cushman, Darby & Cushman

[57] ABSTRACT

A time division multiplexing system for telephone comprises a matrix of $n^2$ two-state elements arranged in rows and in columns. The elements of the same row have respective inputs connected in parallel, these inputs being adapted for receiving telephonic frames. The elements of the same column have their respective outputs adapted for delivering telephonic frames. The $n^2$ elements have respective control inputs for triggering from one conducting state to the other blocked state or vice-versa. These $n^2$ control inputs are connected successively and cyclically to the $n^2$ bistable elements of the successive columns, of a memory having p columns, by means of a shift register.

5 Claims, 6 Drawing Figures

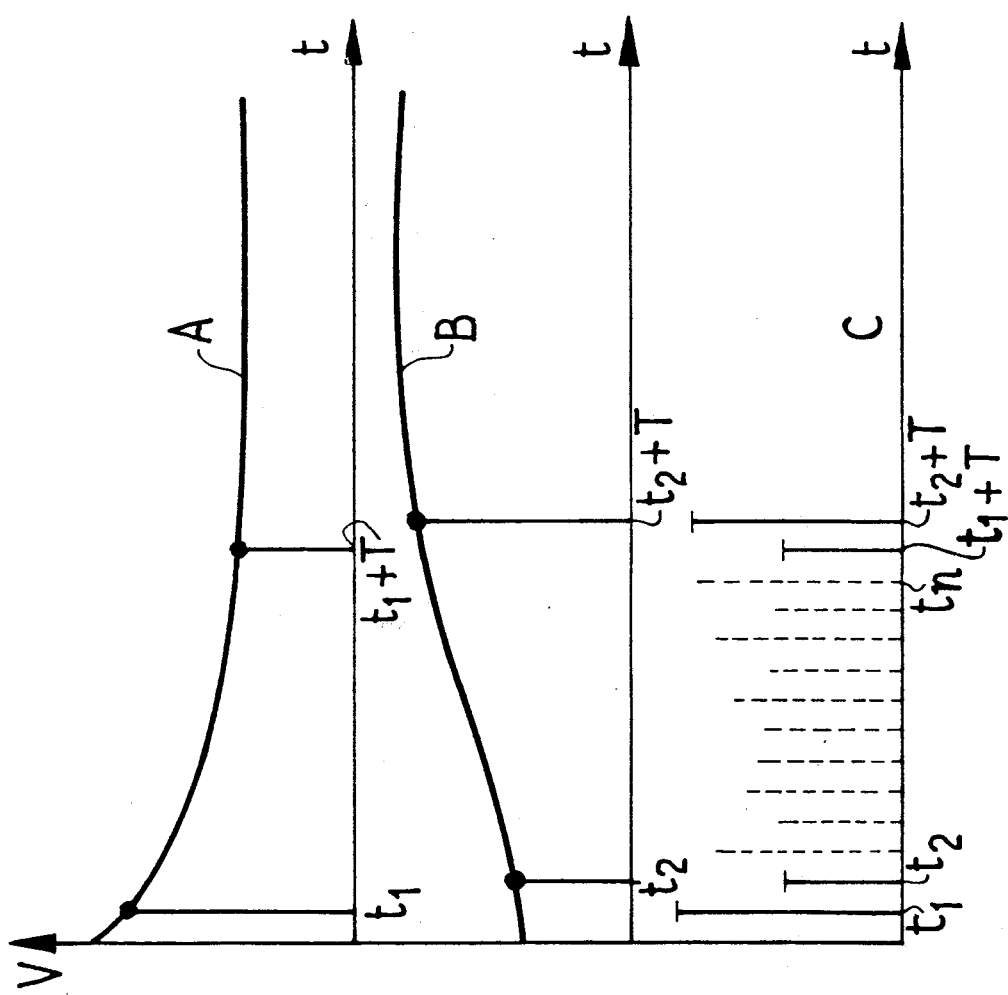

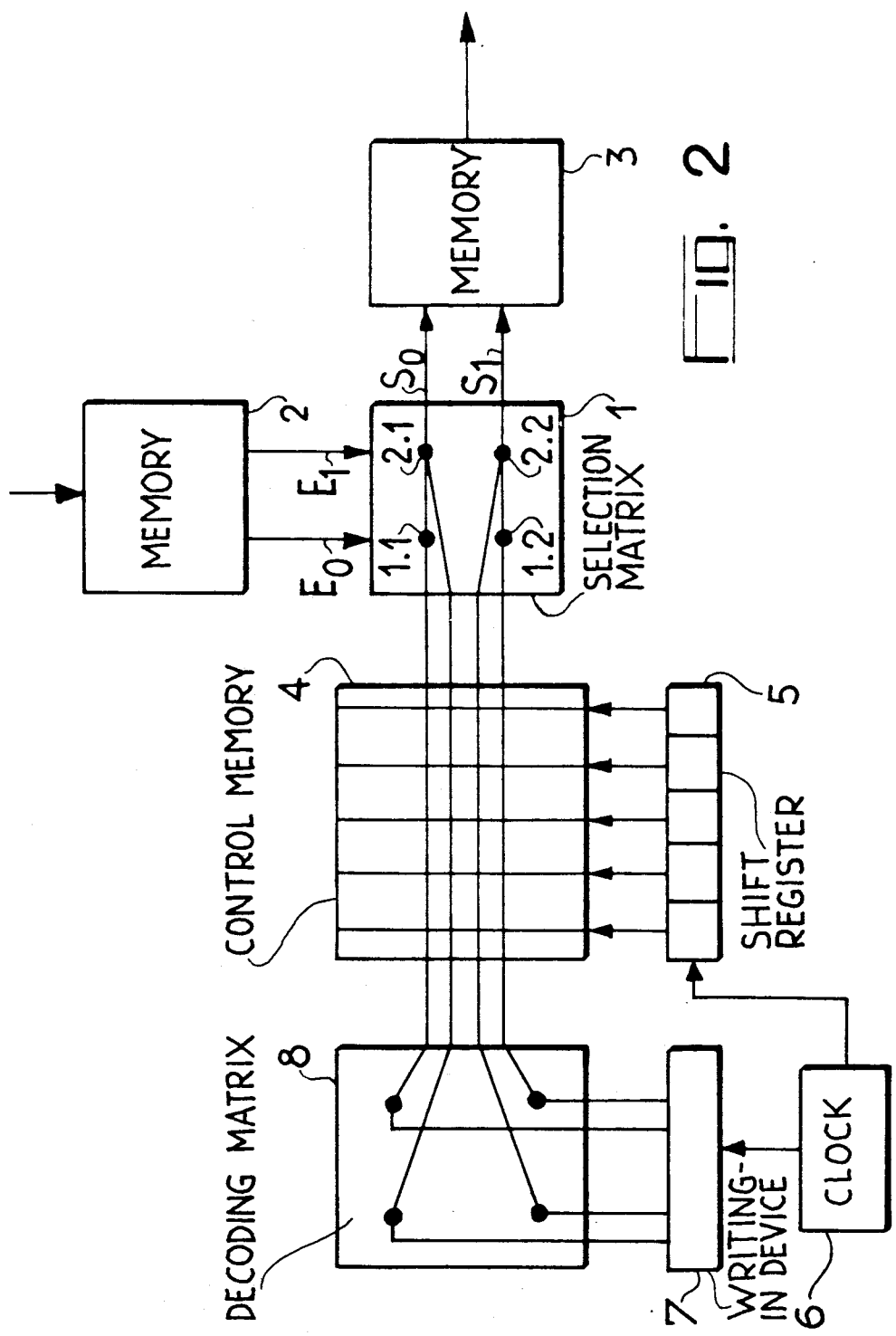

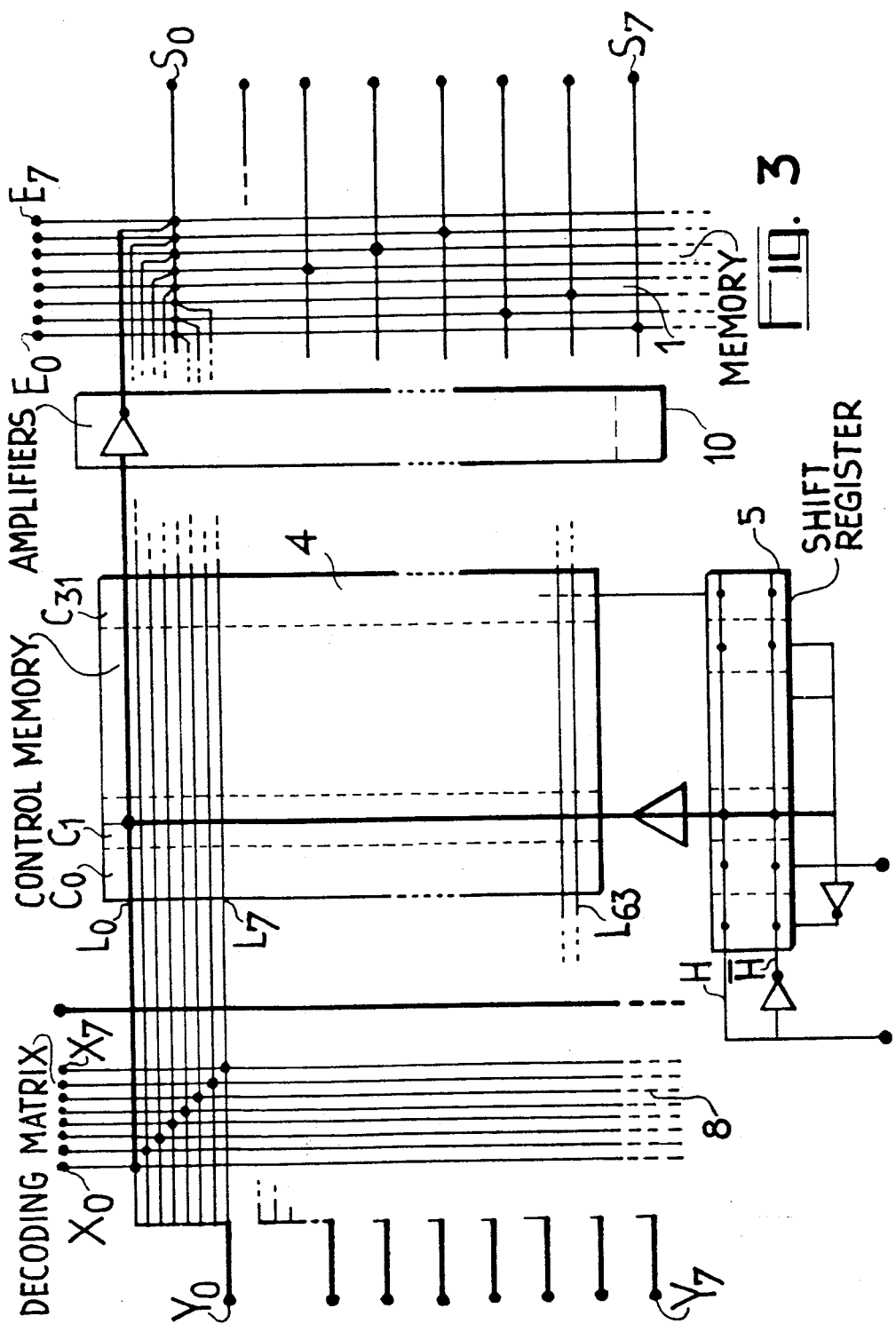

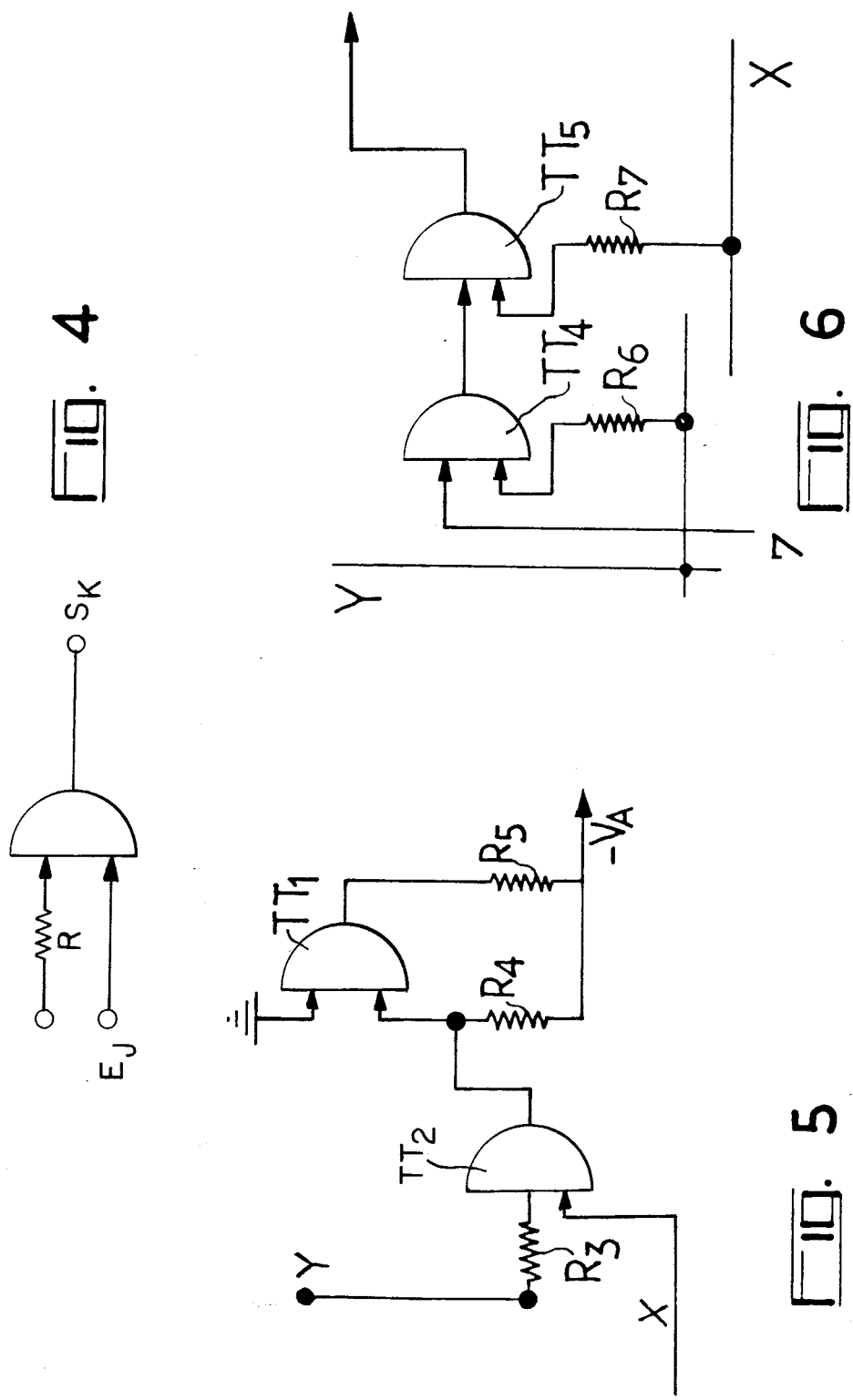

FINE DIVISION TELEPHONE MULTIPLEXED SWITCHING NETWORK

So-called "time division" telephone switching comprises attributing to each conversation a position in a "frame". A device memorizes the signals representing each conversation and resulting from samples taken during successive cycles.

It restores them to new wires in the appropriate order.

The present invention relates to a switching system operating in time division and conventionally based on integrated circuits of very low consumption and high switching speed. The switching system according to the invention makes it possible to use integrated circuits which are simple to construct and which can be switched at high speed from one stable state to another. The system according to the invention is of the type which comprises $n$ inputs capable of receiving temporal telephony frames and $n$ outputs capable of delivering frames of the same type, and which is capable of connecting inputs and outputs, respectively, as required according to the rhythm of a clock, each input being connected to one output and one output only and vice versa. It is distinguished by the fact that, on the one hand, it comprises $n^2$ logical connecting gates arranged in lines and in columns, these gates each connecting an input to an output and receiving their control voltage from $n^2$ two stable state elements, these $n^2$ elements being contained in a matrix of $p$ columns of $n^2$ elements, a shift register addressing these $p$ columns successively and cyclically, a selection element enabling the elements of each column to be brought at any instant from one stable state into the other.

The invention is described in more detail in the following with reference to the accompanying drawings, wherein:

FIG. 1 is a group of curves recalling the principle of time division switching;

FIG. 2 is a basic circuit diagram of the system according to the invention;

FIG. 3 is a synoptic plan of an arrangement comprising 8 inputs and 8 outputs;

FIGS. 4, 5 and 6 illustrate exemplary embodiments of details of the arrangement shown in FIG. 3.

The principle of time division switching may be briefly recalled to mind with the aid of the diagrams shown in FIG. 1.

First of all, it will be remembered that the voice frequencies, i.e. communications, to be transmitted have a frequency band which extends from some 300 Hz to 3000 – 3400 Hz. FIG. 1 shows at A and B two telephonic signals to be transmitted as a function of time. These two signals are sampled at time intervals T, one at the times $t1, t1 + T \ldots t1 + nT \ldots$, and the other at the times $t2, t2, + T, t2 + nT \ldots$, with $t1 - t2 = (T/n)$, etc . . .

It can be shown that this sampling does not have any effect upon the quality of transmission, provided that the maximum frequency to be transmitted is below $(1/T)$, i.e. T must be less than $(1/3000)$ sec.

In general, $T = (1/8000)$ sec. All the signals $t1 \ldots t1 + nT \ldots, t2 \ldots$ are sampled, quantified and transmitted by the same telephone line as shown by the curve C. In general, 32 conversations are thus transmitted over the same channel by successive cycles, communications $t1, t2 \ldots tn, t1 + T \ldots tn + T$ thus forming what is termed a frame and so on. The problem arises of separating these conversations and transmitting them to the parties concerned. As were seen earlier on, expensive and complicated computers are generally used for this purpose.

The arrangement according to the invention is intended for a system of this kind. It is designed to receive at its inputs, in the present case two inputs in order to simplify the description, and to transmit at its two outputs telephonic frames of the same kind, made up of input block elements, but combined in a different way.

It comprises a selection matrix 1 of which the four elements are logic gates and each of which has an input and an output as well as a control input by which they are brought from the unblocked or conducting state to the blocked state and vice versa. Since the elements are arranged in lines and in columns, their inputs and their outputs are connected to the two inputs and to the two outputs, respectively, of the matrix.

There are, thus, four elements, either conductive or blocked. The two inputs Eo and E1 and the two outputs So and S1 are respectively connected to two memories 2 and 3, one being a so-called "input memory" and the other a socalled "output memory".

These two memories deliver or receive the numbers which translate the elements of a frame into digital data, as was seen earlier on.

The control inputs are respectively connected in parallel to the four homolog elements of each column (in this case 5 columns) of a control memory 4. These memory elements have two stable states, one corresponding to the "0" state and the other to the "1" state.

They comprise an output connected to one of the control inputs of the matrix, a control input enabling them to be brought from one state into the other and, finally, an address input. The address inputs of the elements of each column are respectively connected to the outputs of the 5 stages of a shift register 5, controlled by a clock 6, which synchronizes the operation of the system.

In the course of one complete cycle of operation, all the elements of the memory 4 are addressed column by column.

The clock 6 also controls the synchronization of a writing device 7 connected to the four connection points of a decoding matrix 8.

These four connection points are connected in parallel to the four points of each of the $n$ columns of the matrix 4. These points are each capable of delivering voltages with levels 1 or 0. The writing device 7 is capable of transmitting pulses along a separate address line to each of these connection points and of bringing it from the "0" state into the "1" state or vice versa.

The system operates as follows:

A word is written into the decoding matrix 8. Accordingly, at most two of the connection points of this memory are in the "1" state and the others in the "0" state.

By virtue of the connection lines, all the points of equal order of each column are in states controlled by the four points of the decoding matrix 8 in the memory 4.

The address register 5 addresses the columns of the memory 4 successively and cyclically. The states of the points of these columns are also transmitted cyclically to the four selection points of the selection matrix 1. Accordingly, the input terminals of this matrix are sequentially connected to the outputs selected by the state of the connection points.

Thus, if at any instant the state of the circuit 8 necessitates a change of state in a column of the memory 4, the content of that column will subsequently be addressed to the matrix 1 at the instant defined by the flow of information from the shift register 5 on the position of the column. If the four points of the matrix 1 are denoted 1.1, 1.2, 2.1, 2.2, it will be seen that there are two possible combinations for each of the inputs Eo or E1 to be connected to one of the outputs So or S1, i.e.

|     | Eo → So | or | Eo → S1 |
| --- | --- | --- | --- |
| and |  |  |  |
|     | E1 → S1 |  | E1 → So |

FIG. 3 shows a more complex connection diagram in which the memory 4 has as many columns as the word of each frame has numbers, namely 32, the outputs and the inputs of the matrix 1 being 8 in number, namely Eo to 7, So to S7. The matrix 1 has 64 connection points. The memory 4 has 32 columns and 64 lines. The matrix 8 also has 64 connection points. The memory 4 is addressed by a 32-stage decoding register. The 64 outputs of the memory 4 are respectively connected to the 64 points of the matrix 1 by amplifiers which are collectively denoted by the reference 10. There are only 8 connection possibilities if each input is intended to communicate with no more than one output and vice-versa. Accordingly, the numbers written into each column will only have 8 "1"s, the others only being "0"s, because only 8 points out of the 64 of the connection matrix are addressed at each instant.

If the contents of one or more of the columns of the memory 4 are modified, the arrangement of the 8 conducting connection points out of 64 of the matrix 1 will be modified at the corresponding instants of their reading in relation to the previous arrangement at the same instants of previous sequences.

The present system may be compared with a railway switching yard. Eight trains, the frames, simultaneously enter the connection matrix. Eight trains of the same type leave it. The wagons of these trains are the samples of conversation of each frame.

The following Figures illustrate exemplary embodiments.

These exemplary embodiments are based on a pnpn arrangement of the type described in French Patent Application No. 74.14 979 filed on Apr. 30th, 1974. This type of component, which will be denoted hereinafter by the reference "T T", is in reality an AND-gate with two inputs and one output, with a very high switching speed and with a very low resistance when it is conductive and with a very high resistance when it is blocked.

The connection point of the matrix 1 is shown in FIG. 4.

It comprises a component T T, of which the control electrode is connected to the corresponding line of the control memory by a resistance R, its input electrode Ej to the corresponding input of the matrix and its output Sk to the corresponding output of the matrix.

If the level 1 appears at the two inputs, the component T $T_1$ is conductive and the level 1 appears at its output. If only one of the inputs is at the level 0, the output is at the level "0".

In the following figures, the T T components are represented as shown for the sake of clarity.

FIG. 5 shows one of the 32 × 64, i.e. 2058, memory points of the control memory.

The memory point comprises two components T $T_1$ and T $T_2$ connected in series as shown. One of the inputs of the component T $T_2$ is connected to the address line at Y. The other input is connected to the address line at X. This input is at the "0" or "1" potential, depending on whether the point of the matrix 8 to which it is connected is at the "0" or "1" potential. Similarly, the input at Y is at the "1" level when it is addressed by the decoding register.

Resistances $R_3$, $R_4$, $R_5$ are introduced as shown in the Figures.

The resistance $R_4$ and $R_5$ are connected in parallel to the negative terminal of a feed source, feeding the voltage $-V_4$.

If the input Y is addressed and if the input X controlled by the matrix "8" is at the level 1, the input of the pnpn transistor T $T_2$ will be at the level 1. The component T $T_2$ is brought into the blocked state.

It will remain there as long as the line X remains at the level "1". If the line X is brought into the state "0" when the column is addressed, the terminal of the resistance $R_4$ connected to the two components will be in the state 0. It follows that the transistor T $T_1$ will become conductive.

FIG. 6 shows an embodiment of one of the 64 connection points of the decoding matrix 8.

It comprises two elements T $T_4$ and T $T_5$ of which the inputs at X and at Y are connected to the lines X and Y by two resistances R6 and R7, respectively.

The writing line connected to the second input of the transistor T $T_4$ is connected to the device 6. The output of the element is taken at the output of the transistor T $T_5$ and is connected to the line of corresponding elements of the control memory.

The operation of this arrangement is very simple. If the point is addressed, the lines X and Y are at the level 1. If the number delivered by the writing device is 1, the component T $T_4$ will deliver the voltage 1 to the input of the component T $T_5$. Since the component T $T_5$ is addressed with the voltage 1 at its input X, it will deliver the voltage 1 at its output.

If the writing device delivers the voltage 0, the output of the transistor T $T_4$ is at the potential 0. The same applies to the output of the transistor T $T_5$.

Other embodiments are of course possible without departing from the scope of the invention.

In particular, the control memory may be formed by a group of decoding registers functioning as a synchroniser.

What we claim is:

1. A telephone switching system comprising $n$ inputs capable of simultaneously receiving first frames of telephonic signals and $n$ outputs capable of simultaneously delivering second frames of the same kind as said first, and connection means capable of connecting at will each of the $n$ inputs to each said $n$ outputs respectively, a connection matrix of $n^2$ connection points for connecting always one input to one output and one only, each of said connection points being a two-state bistable element, said element being blocked in one of said states and conducting in the other, and having a control input for triggering them from one state to the other, a connection memory comprising $p$ columns of $n^2$ two-state bistable elements, each having an output, said control inputs being connected to said $p \times n^2$ outputs, a shift register addressing said $p$ columns successively and cyclically, a control memory of $n^2$ control elements having respective outputs, enabling the states of the $p$ elements of a column to be triggered from one state to the other at any instant.

2. A system as claimed in claim 1, wherein the $n^2$ connection points are each formed by an AND-gate having one input connected to the corresponding system input, one output to the corresponding system output and a second input to the common reading line of the $p$ points of the corresponding line of the control memory.

3. A system as claimed in claim 1, wherein each of the memory elements of the control memory comprises an AND-gate with a first input connected to the corresponding stage of the shift register, its second input connected to a memory point with two significant states of the numbers "0" and "1" and delivering in the state "1" a voltage of level "1" and in the state "0" a zero voltage, the output of the AND-gate being connected in parallel with that of the $p$ other points of equal order in the successive columns to the corresponding connection point by means of a writeread connection line, said line enabling or causing the memory point to be brought from one state into the other or its state to be read.

4. A system as claimed in claim 1, wherein the writeread lines of the $n^2$ elements of each column are respectively connected to the $n^2$ elements of a decoding matrix with $n$ inputs and $n$ outputs, a connection point enabling one of these $n$ inputs to be connected to one of the $n$ outputs in one state and enabling this connection to be cancelled in the other state, each output being connected to a different input and each input to a different output, these points being arranged in lines connected to the outputs and in columns connected to the inputs, each connection point being addressed by a line connection and by a column connection and having an input controlled by a writing device enabling it to be brought from one state into the other and vice versa.

5. A system as claimed in claim 4, wherein each writeread line of the control memory is one of the said connection points, each of these points comprising two AND-gates with two inputs connected respectively to the line connections and to the column connections, the input of the first gate being connected to the write line, its output being connected to the input of the second gate, the output of the second gate being connected to the writeread line, the connection being established when the line connections and column connections are simultaneously in the state 1 and when the write line addresses the voltage 1.

* * * * *